US011401425B2

(12) United States Patent
Tang et al.

(10) Patent No.: US 11,401,425 B2
(45) Date of Patent: Aug. 2, 2022

(54) COATING COMPOSITIONS

(71) Applicant: Dow Global Technologies LLC, Midland, MI (US)

(72) Inventors: Houxiang Tang, Midland, MI (US); David L. Malotky, Midland, MI (US); Ray E. Drumright, Midland, MI (US); Nicholas B. Schaffer, Midland, MI (US); Cynthia Stants, Midland, MI (US); Bernhard Kainz, Rheinmuenster (DE)

(73) Assignee: Dow Global Technologies LLC, Midland, MI (US)

( * ) Notice: Subject to any disclaimer, the term of this patent is extended or adjusted under 35 U.S.C. 154(b) by 499 days.

(21) Appl. No.: 16/658,837

(22) Filed: Oct. 21, 2019

(65) Prior Publication Data
US 2020/0123393 A1 Apr. 23, 2020

Related U.S. Application Data

(60) Provisional application No. 62/748,655, filed on Oct. 22, 2018.

(51) Int. Cl.
| | | |
|---|---|---|
| *C08L 23/10* | (2006.01) | |
| *C08L 23/12* | (2006.01) | |
| *C09D 123/10* | (2006.01) | |
| *C09D 5/02* | (2006.01) | |
| *C08K 5/00* | (2006.01) | |
| *C08K 5/20* | (2006.01) | |
| *C08L 23/06* | (2006.01) | |
| *C08L 23/26* | (2006.01) | |
| *C08L 33/06* | (2006.01) | |
| *C08L 91/06* | (2006.01) | |
| *C09D 5/08* | (2006.01) | |
| *C09D 123/16* | (2006.01) | |

(52) U.S. Cl.
CPC ............ *C09D 5/022* (2013.01); *C08K 5/0025* (2013.01); *C08K 5/20* (2013.01); *C08L 23/06* (2013.01); *C08L 23/12* (2013.01); *C08L 23/26* (2013.01); *C08L 33/064* (2013.01); *C08L 91/06* (2013.01); *C09D 5/086* (2013.01); *C08L 2201/54* (2013.01); *C08L 2203/16* (2013.01); *C08L 2205/035* (2013.01); *C09D 123/10* (2013.01); *C09D 123/16* (2013.01)

(58) Field of Classification Search
CPC .......... C08L 23/10; C08L 23/12; C08L 23/14; C08L 23/16; C08L 23/26; C08L 2205/035; C09D 5/022; C09D 123/10; C09D 123/12; C09D 123/16
See application file for complete search history.

(56) References Cited

U.S. PATENT DOCUMENTS

| | | | |
|---|---|---|---|
| 8,779,053 B2 * | 7/2014 | Lundgard | ................ B32B 1/00 |
| | | | 524/576 |
| 9,169,406 B2 * | 10/2015 | Wilbur | .................. C09D 5/024 |
| 9,416,291 B2 | 8/2016 | Wilbur et al. | |
| 9,422,444 B2 * | 8/2016 | Lundgard | .......... C09D 123/142 |
| 10,221,327 B2 * | 3/2019 | Drumright | ............. C09J 123/10 |
| 2006/0069187 A1 | 3/2006 | Klosiewicz | |
| 2015/0147502 A1 | 5/2015 | Lindenmuth et al. | |
| 2015/0344718 A1 | 12/2015 | Lundgard et al. | |

FOREIGN PATENT DOCUMENTS

| | | |
|---|---|---|
| WO | 2006039462 | 4/2006 |
| WO | 2011011707 | 1/2011 |

* cited by examiner

*Primary Examiner* — Rip A Lee
(74) *Attorney, Agent, or Firm* — Brooks, Cameron & Huebsch, PLLC

(57) ABSTRACT

The present disclosure provides for an aqueous dispersion for use in coating applications. The aqueous dispersion includes an aqueous composition and a solid content of a melt blend product having an acid functionalized polypropylene base polymer, a polypropylene copolymer, an acid functionalized polypropylene wax and an acid functionalized polyolefin. The aqueous dispersion is included in a coating composition, where the coating composition includes the aqueous dispersion, a solvent, a crosslinker and a basic water composition having water and a base. The present disclosure also provides for a coated article having a substrate and a coating on the substrate, where the coating includes the coating composition of the present disclosure.

20 Claims, No Drawings

COATING COMPOSITIONS

This application is a Non-Provisional Application, which claims the benefit to U.S. Provisional Application 62/748,655, filed Oct. 22, 2018, the entire contents of which are incorporated herein by reference in its entirety.

FIELD OF DISCLOSURE

The present disclosure relates generally to coating compositions, and more particularly to coating compositions for coating metal substrates used in food and beverage packaging.

BACKGROUND

The application of various treatment and pretreatment solutions to metals to retard or inhibit corrosion is well established. This is particularly true in the area of metal food and beverage cans as well as non-food metal containers. Coatings are applied to the interior of such containers to prevent the contents (e.g., food or beverage) from contacting the metal of the container. Contact between the metal and the food or beverage as well as non-food substances can lead to corrosion of the metal container, which can then contaminate the food or beverage or the non-food contents of such metal containers.

Corrosion is particularly problematic when food and beverage products are highly acidic and/or are having a high salt content such as a rhubarb-based products or isotonic drinks. Also, strong alkaline contents of non-food substances such as hair-dye may react with metal such as aluminum. The coatings applied, for example, to the interior of food and beverage cans also helps prevent corrosion in the head space of the cans, which is the area between the fill line of the food product and the can lid. The coatings may also be applied to the outside of metal containers to provide protection against the external environment and/or to provide a decorative layer including fillers and/or pigments.

In addition to corrosion protection, coatings for food and beverage cans should be non-toxic and inert, and, if applied to the internal surface, should not adversely affect the taste and/or appearance, e.g., color, of the food or beverage in the can or contribute to a contamination of the contents of the can. Resistance to "popping", "blushing" and/or "blistering" is also desired, especially during high temperature processing conditions, e.g., retort processing. Retort processing is the process where packaged food or beverages are sterilized as well as cooked, where necessary, properly to achieve safety and quality. During the retort process the food or beverage cans with their content are sterilized at a temperature of about 121° C. or higher. Many coatings, however, are unable to withstand such temperatures and then provide subsequent coating performance. As such, there is a need for coatings for food and beverage containers that can better withstand the conditions of retort processing.

SUMMARY

The present disclosure provides for an aqueous dispersion and its use in coating a metal substrate, especially the coating of metal cans for food and beverage packaging. The aqueous dispersion and its use in a coating composition for a metal substrate helps to improve the resistance of the coating on the metal substrate to food product when subjected to high temperature processing conditions, e.g., retort processing. In contrast to other approaches, the aqueous dispersion of the present disclosure includes, among other things, a high melting point polypropylene based resin with an acid functionality that provides a surprisingly and significantly better coating performance (e.g., better adhesion and less coating softening) for the coating composition after retort processing.

The present disclosure provides for an aqueous dispersion that includes a solid content from 15 weight percent (wt. %) to 60 wt. % based on a total weight of the aqueous dispersion. The solid content includes a melt blend product having 15 to 60 wt. % of an acid functionalized polypropylene base polymer having a melting point of 155° C. to 170° C.; 16 to 50 wt. % of a polypropylene copolymer having a density of less than 0.88 grams/cubic centimeter (g/cm$^3$); 5 to 20 wt. % of an acid functionalized polypropylene wax; and 15 to 30 wt. % of an acid functionalized polyolefin, where the wt. % is based on the total weight of the melt blend product and components of the melt blend product add to 100 wt. %.

The melt blend product can have a variety of wt. % values for each of the various components provided above. For example, the melt blend product of the aqueous dispersion can include 20 to 55 wt. % of the acid functionalized polypropylene base polymer having a melting point of 155° C. to 170° C. In addition, the melt blend product of the aqueous dispersion can include 26 to 46 wt. % of the acid functionalized polypropylene base polymer having a melting point of 155° C. to 170° C. For the various embodiments, the acid functionalized polypropylene base polymer having a melting point of 155° C. to 170° C. can have an acid number of 2 to 15.

The acid functionalized polypropylene base polymer can also have other melting point values. For example, the acid functionalized polypropylene base polymer can have a melting point of 160° C. to 170° C. More specifically, the acid functionalized polypropylene base polymer can have a melting point of 162° C. to 167° C. Melting point is measured according to ASTM D3418-15.

Other weight percent values for each of the components of the melt blend product provided herein are also possible in the present disclosure. For example, the melt blend product of the aqueous dispersion provided herein can also include 17-45 wt. % of the polypropylene copolymer having a density of less than 0.88 g/cm$^3$. The melt blend product may include 5 to 15 wt. % of the acid functionalized polypropylene wax. The melt blend product may include 9 to 11 wt. % of the acid functionalized polypropylene wax. The melt blend product may include 15 to 25 wt. % of the acid functionalized polyolefin. The melt blend product may include 19 to 25 wt. % of the acid functionalized polyolefin. As seen herein, the melt blend product to which the above examples apply includes 15 to 60 wt. % of the acid functionalized polypropylene base polymer having a melting point of 155° C. to 170° C., 16 to 50 wt. % of a polypropylene copolymer having a density of less than 0.88 grams/cubic centimeter (g/cm$^3$), 5 to 20 wt. % of the acid functionalized polypropylene wax, and 15 to 30 wt. % of the acid functionalized polyolefin, where the wt. % is based on the total weight of the melt blend product and components of the melt blend product add to 100 wt. %.

Specific examples of the various components of the melt blend product include the following. The acid functionalized polypropylene wax in the melt blend product can be a maleic anhydride modified polypropylene wax. The acid functionalized polyolefin can be an ethylene-acrylic acid copolymer. The acid functionalized polypropylene base polymer having a melting point of 155° C. to 170° C. can be an anhydride modified polypropylene. In a preferred embodiment, the acid functionalized polypropylene base polymer is a maleic anhydride modified polypropylene, as discussed herein.

The melt blend product used in the aqueous dispersion can also include 0.1 to 10 wt. % of a polyethylene wax, where the wt. % is based on the total weight of the melt blend product. Other wt. % ranges for the polyethylene wax for use with the melt blend product of the aqueous dispersion include 0.2-5 wt. %, with a value of 0.5-4 wt. % being most preferred.

For the various embodiments, the polypropylene copolymer having a density of less than 0.88 g/cm$^3$ can be formed with propylene and ethylene, where the polypropylene copolymer has a melt index value, as determined by ASTM D-1238 at 230° C. and 2.16 kg, of about 25 g/10 min and a glass transition temperature of about −26° C.

The present disclosure also provides for a coating composition that includes 15 to 100 wt. % of the aqueous dispersion, as provided herein, based on total weight of the coating composition; a solvent, where the solvent is from 0 wt. % to 80 wt. % based on the solid content of the aqueous dispersion; a crosslinker, where the crosslinker is from 0 wt. % to 6 wt. % based on the solid content of the aqueous dispersion; and a basic water composition comprising from 90 to 99.99 wt. % of water based on a total weight of the basic water composition and from 0.01 percent to 10 wt. % of a base based on the total weight of the basic water composition, where the basic water composition is from 0 wt. % to 85 wt. % of the coating composition based on the total weight of the coating composition. For the various embodiments, the crosslinker can be a hydroxyl alkyl amide. In addition, for the various embodiments the solvent can be selected from the group consisting of alcohols, glycols, glycol ethers such as ethylene glycol, n-butyl ethylene glycol ether, diethylene glycol monoethyl ether, propylene glycol, dipropylene glycol dimethyl ether, propylene glycol methyl ether, n-butanol, ethanol, dipropylene glycol methyl ether and combinations thereof.

The coating composition can be used to make a coated article. The coated article of the present disclosure can include a substrate and a coating on the substrate, wherein the coating includes the coating composition as provided herein. For the various embodiments, the substrate can be a metal substrate. The coated article can include the substrate and a cured coating on the substrate, where the cured coating is formed by curing the coating composition provided herein. In one embodiment, the substrate is a metal can with the cured coating.

DETAILED DESCRIPTION

The present disclosure provides for an aqueous dispersion and its use in coating a metal substrate, especially the coating of metal cans for food and beverage packaging. The aqueous dispersion of the present disclosure and its use in a coating composition for a metal substrate helps to improve the resistance of the coating on the metal substrate to food product when subjected to high temperature processing conditions, e.g., retort processing.

Foods such as soup and pet food, among others, can cause significant coating deterioration under retort processing conditions, such as softening and/or loss of interfacial adhesion. To improve coating resistance to food products under high temperature processing conditions, it is natural to use a base resin with a high melting point (above retort temperature). However, it has been surprisingly shown that using high melting point base resins alone do not lead to better coating performance, rather the performance is unexpectedly worse.

Another potential approach could be to introduce some functionality to base resin to improve interfacial adhesion between the coating formed with the base resin and the metal substrate and thus hopefully preventing coating adhesion loss after retort processing. However, it was also surprisingly discovered that the introduction of acid functionality to base resin does not lead to better post retort coating adhesion.

In contrast to these approaches discussed above, the aqueous dispersion of the present disclosure includes, among other things, a high melting point polypropylene based resin with an acid functionality that provides a surprisingly and significantly better coating performance (e.g., better adhesion and less coating softening) for the coating composition after retort processing. The aqueous dispersion and the coating composition formed using the aqueous dispersion of the present disclosure are also both bisphenol A-non-intent, as well as being free of other substances that may be of concern.

Embodiments of the present disclosure include an aqueous dispersion that includes a solid content from 15 wt. % to 60 wt. % based on a total weight of the aqueous dispersion. The solid content of the aqueous dispersion includes a melt blend product having 15 to 60 wt. % of an acid functionalized polypropylene base polymer having a melting point of 155° C. to 170° C., 16 to 50 wt. % of a polypropylene copolymer having a density of less than 0.88 grams/cubic centimeter (g/cm$^3$), 5 to 20 wt. % of an acid functionalized polypropylene wax, and 15 to 30 wt. % of an acid functionalized polyolefin, where the wt. % is based on the total weight of the melt blend product and components of the melt blend product add to 100 wt. %.

Acid Functionalized Polypropylene Base Polymer

As mentioned, embodiments of the present disclosure provide that the solid content of the aqueous dispersion includes 15 to 60 wt. % of an acid functionalized polypropylene base polymer having a melting point of 155° C. to 170° C., as determined by ASTM D3418-15. The acid functionalized polypropylene base polymer can help to simultaneously provide particular performance characteristics, such as particular appearance properties and particular mechanical and chemical resistance properties for a coated article, which are desirable for some coating applications.

Embodiments provide that the acid functionalized polypropylene base polymer can include polymeric units derived from propylene and polymeric units derived from one or more alpha-olefin comonomers. Examples of comonomers that can be utilized to manufacture the acid functionalized polypropylene base polymer are C2, and C4 to C10 alpha-olefins. For example, C2, C4, C6 and C8 alpha-olefins. The acid functionalized polypropylene base polymer can include from 0.1 to 40 weight percent (wt. %) of units derived from one or more alpha-olefin comonomers. All individual values and subranges from 0.1 to 40 wt. % are included herein and disclosed herein. For example, the wt. % of units derived from one or more alpha-olefin comonomers can be from a lower limit of 0.1, 1, 3, 4, 5, 7, or 9 wt. % to an upper limit of 40, 35, 30, 27, 20, 15, 12, 9, 5 or 3 wt. %. For example, the acid functionalized polypropylene base polymer can comprise from 0.1 to 35 wt. % of units derived from one or more alpha-olefin comonomers; or in the alternative, the acid functionalized polypropylene base polymer can comprise from 0.1 to 30 wt. % of units derived from one or more alpha-olefin comonomers; or in the alternative, the acid functionalized polypropylene base polymer can comprise from 3 to 27 wt. % of units derived from one or more alpha-olefin comonomers; or in the alternative, the acid functionalized polypropylene base polymer can comprise from 3 to 20 wt. % of units derived from one or more alpha-olefin comonomers; or in the alternative, the acid functionalized polypropylene base polymer can comprises from 0.1 to 5 wt. % of units derived from one or more alpha-olefin comonomers; or in the alternative, the acid functionalized polypropylene base polymer can comprises from 0.1 to 3 wt. % of units derived from one or more alpha-olefin comonomers.

The acid functionalized polypropylene base polymer can have an acid number of 2 to 15. Preferably, the acid functionalized polypropylene base polymer has an acid number of 3 to 13 or 4 to 10. The acid number can be determined by ASTM D-1386, for example, where the acid number refers to an amount of KOH in mg KOH/g polymer required to neutralize acid functionality when measured by titration.

The acid functionalized polypropylene base polymer can have a melt flow index of 20 to 300 g/10 min as determined by ASTM D-1238 (190° C./2.16 kg load). All individual values and subranges from 20 to 300 g/10 min are included herein and disclosed herein. For example, acid functionalized polypropylene base polymer can have a melt flow index from a lower limit of 20, 50 or 80 g/10 min to an upper limit of 300, 250, 200, 150 or 130 g/10 min. as determined by ASTM D-1238 (190° C./2.16 kg load). For example, the acid functionalized polypropylene base polymer can have a melt flow index from 50 to 130 or 80 to 200 g/10 min as determined by ASTM D-1238 (190° C./2.16 kg load).

Embodiments of the present disclosure provide that the acid functionalized polypropylene base polymer can be an anhydride modified polypropylene. Examples of the anhydride modified polypropylene include maleic anhydride functionalized polypropylene. Maleic anhydride functionalized polypropylene copolymers, terpolymers and blends may also be used. Examples of such polymers include propylene-ethylene alternating copolymers and propylene-ethylene diblock copolymers e.g., propylene-ethylene alternating copolymers. Maleic anhydride functionality can be incorporated into the polymers by grafting or other reaction methods. When grafting, the level of maleic anhydride incorporation is typically below 3 wt. % based on the weight of the polymer. Examples of commercially available maleic anhydride functionalized polypropylene include those available under the tradename FUSABOND®, such as FUSABOND® P613, among others, available from DuPont™. Additional examples of commercially available maleic anhydride functionalized polypropylene include those available under the tradename MORTON™ 899P, MORTON™ 199P and MORTON™ 100P, among others, available from Morton International Inc or under the tradename Eastman™ G-3003, among others, available from Eastman™.

Embodiments of the present disclosure provide that the acid functionalized polypropylene base polymer is from 15 to 60 wt. % based on the total weight of the melt blend product of the aqueous dispersion. All individual values and subranges from 15 to 60 wt. % based on the total weight of the melt blend product of the aqueous dispersion are included herein and disclosed herein. For example, the acid functionalized polypropylene base polymer can be from a lower limit of 15, 20, or 26 wt. % based on the total weight of the melt blend product of the aqueous dispersion to an upper limit of 46, 55, or 60 wt. % based on the total weight of the melt blend product of the aqueous dispersion. For example, the melt blend product of the aqueous dispersion can comprise from 20 to 55 wt. % based on the total weight of the melt blend product of the aqueous dispersion or 26 to 46 wt. % based on the total weight of the melt blend product of the aqueous dispersion.

Embodiments of the present disclosure provide that the acid functionalized polypropylene base polymer can have a density in a range of 0.895 grams per cubic centimeter (g/cm$^3$) to 0.92 g/cm$^3$. All individual values and subranges from 0.895 g/cm$^3$ to 0.92 g/cm$^3$ are included herein and disclosed herein. For example, acid functionalized polypropylene base polymer can have a density from a lower limit of 0.895, 0.900, or 0.903 g/cm$^3$ to an upper limit of 0.92, 0.915, or 0.91 g/cm$^3$. For example, the high density polypropylene can have a density from 0.900 to 0.915 g/cm$^3$ or 0.900 to 0.91 g/cm$^3$.

The acid functionalized polypropylene base polymer may have different number average molecular weights. For example, the acid functionalized polypropylene base polymer can have a number average molecular weight of greater than 800 grams/mole. For example, greater than 5000 grams/mole; or in the alternative, greater than 40000 grams/mole. The acid functionalized polypropylene base polymer can have a molecular weight distribution (MWD), defined as weight average molecular weight divided by number average molecular weight (Mw/Mn) of 3.5 or less; in the alternative 3.0 or less; or in another alternative from 1.8 to 3.0.

The acid functionalized polypropylene base polymer also has a melting point of 155° C. to 170° C. In an additional example, the acid functionalized polypropylene base polymer has a melting point of 160° C. to 170° C. In a preferred embodiment, the acid functionalized polypropylene base polymer has a melting point of 162° C. to 167° C. The melting point of the acid functionalized polypropylene base polymer is measured according to ASTM D3418-15.

Polypropylene Copolymer

Embodiments of the present disclosure provide that the melt blend product of the aqueous dispersion further includes 16 to 50 wt. % of a polypropylene copolymer having a density of less than 0.88 grams/cubic centimeter (g/cm$^3$), as determined by ASTM D792. All individual values and subranges from 16 to 50 wt. % based on the total weight of the melt blend product of the aqueous dispersion are included herein and disclosed herein. For example, the polypropylene copolymer can be from a lower limit of 16, 17, or 20 wt. % based on the total weight of the melt blend product of the aqueous dispersion to an upper limit of 40, 45, or 50 wt. % based on the total weight of the melt blend product of the aqueous dispersion. For example, the melt blend product of the aqueous dispersion can comprise from 17 to 45 wt. % of the polypropylene copolymer based on the total weight of the melt blend product of the aqueous dispersion or 20 to 40 wt. % of the polypropylene copolymer based on the total weight of the melt blend product of the aqueous dispersion.

Embodiments provide that the polypropylene copolymer includes units derived from propylene and polymeric units derived from one or more alpha-olefin comonomers. Examples of comonomers that can be utilized to manufacture the polypropylene copolymer are C2, and C4 to C10 alpha-olefins. For example, C2, C4, C6 and C8 alpha-olefins. The polypropylene copolymer can include from 1 to 40 wt. % of units derived from one or more alpha-olefin comonomers. All individual values and subranges from 1 to 40 wt. % are included herein and disclosed herein. For example, the wt. % of units derived from one or more alpha-olefin comonomers can be from a lower limit of 1, 3, 4, 5, 7, or 9 wt. % to an upper limit of 40, 35, 30, 27, 20, 15, 12, or 9 wt. %. For example, the polypropylene copolymer can comprise from 1 to 35 wt. % of units derived from one or more alpha-olefin comonomers; or in the alternative, the polypropylene copolymer can comprise from 1 to 30 wt. % of units derived from one or more alpha-olefin comonomers; or in the alternative, the polypropylene copolymer can comprise from 3 to 27 wt. % of units derived from one or more alpha-olefin comonomers; or in the alternative, the polypropylene copolymer can comprise from 3 to 20 wt. % of units derived from one or more alpha-olefin comonomers; or in the alternative, the polypropylene copolymer can comprises from 3 to 15 wt. % of units derived from one or more alpha-olefin comonomers. Examples of such polypropylene copolymers include propylene-ethylene alternating copolymers and propylene-ethylene diblock copolymers e.g., propylene-ethylene alternating copolymers.

Examples of suitable polypropylene copolymers include some available under the tradename VERSIFY™, where suitable examples include VERSIFY™ 4200, VERSIFY™ 4301, VERSIFY™ 3200, VERSIFY™ 3401, and VERSIFY™ 3300, all available from The Dow Chemical Company.

According to a number of embodiments of the present disclosure, the polypropylene copolymer may include a functionalized polypropylene copolymer where the polymer has been modified with a hydroxyl, an amine, an aldehyde, an epoxide, an ethoxylate, an ester, an anhydride group, an acid group, or combinations thereof. The polypropylene copolymer has an acid number of less than 1.

Embodiments of the present disclosure provide that the polypropylene copolymer has a density of less than 0.88 g/cm$^3$. For example, the polypropylene copolymer can have a density in a range of 0.858 g/cm$^3$ to 0.88 g/cm$^3$. All individual values and subranges from 0.858 g/cm$^3$ to 0.88 g/cm$^3$ are included herein and disclosed herein. For example, the polypropylene copolymer can have a density from a lower limit of 0.858, 0.860 or 0.862 g/cm$^3$ to an upper limit of 0.88, 0.878 or 0.876 g/cm$^3$. For example, the polypropylene copolymer can have a density from 0.860 to 0.88 g/cm$^3$ or 0.862 to 0.88 g/cm$^3$.

The polypropylene copolymer can have a melt flow index of 2 to 50 g/10 min as determined by ASTM D-1238 (230° C./2.16 kg load). All individual values and subranges from 2 to 50 g/10 min are included herein and disclosed herein. For example, the polypropylene copolymer can have a melt flow index from a lower limit of 2 or 8 g/10 min as determined by ASTM D-1238 (230° C./2.16 kg load) to an upper limit of 50 g/10 min as determined by ASTM D-1238 (230° C./2.16 kg load). For example, the polypropylene copolymer can have a melt flow index from 2 to 8 g/10 minor from 8 to 50 g/10 min or from 15-40 g/10 min as determined by ASTM D-1238 (230° C./2.16 kg load).

The polypropylene copolymer can have a glass transition temperature (Tg, ° C.) of −15 to −35° C. All individual values and subranges from −15 to −35° C. are included herein and disclosed herein. For example, the polypropylene copolymer can have a Tg from a lower limit of −35, −33, −32, −30 or −26° C. to an upper limit of −15 or −17° C. For example, the polypropylene copolymer can have a Tg value from −33 to −17° C. or from −30 to −15° C. Glass transition temperatures are determined using the inflection point temperature measured using a differential scanning calorimetry.

In a preferred embodiment, the polypropylene copolymer has a density of less than 0.88 g/cm$^3$ where the polypropylene copolymer is formed with propylene and ethylene, where the polypropylene copolymer has a melt index value, as determined by ASTM D-1238 at 230° C. and 2.16 kg, of about 25 g/10 min and a glass transition temperature of about −26° C., where the glass transition temperature is determined as discussed above.

The polypropylene copolymer can have a molecular weight distribution (MWD), defined as weight average molecular weight divided by number average molecular weight (Mw/Mn) of 6 or less; in the alternative 4 or less; or in another alternative from 2 to 3. In addition, the polypropylene copolymer can have a number average molecular weight greater than 5,000 grams/mole; or in the alternative, greater than 25,000 grams/mole. For example, from 25,000 grams/mole to 50,000 grams/mole. The polypropylene copolymer may have different melting points for various applications.

Acid Functionalized Polypropylene Wax

Embodiments of the present disclosure provide that the melt blend product of the aqueous dispersion further includes 5 to 20 wt. % of an acid functionalized polypropylene wax based on the total weight of the melt blend product. All individual values and subranges from 5 to 20 wt. % based on the total weight of the melt blend product of the aqueous dispersion are included herein and disclosed herein. For example, the acid functionalized polypropylene wax can be from a lower limit of 5, 8, or 10 wt. % based on the total weight of the melt blend product of the aqueous dispersion to an upper limit of 12, 15, or 20 wt. % based on the total weight of the melt blend product of the aqueous dispersion. For example, the melt blend product of the aqueous dispersion can comprise from 5 to 15 wt. % of the acid functionalized polypropylene wax, from 10 to 12 wt. % of the acid functionalized polypropylene wax, or where the melt blend produce includes 9 to 11 wt. % of the acid functionalized polypropylene wax, where the wt. % is based on the total weight of the melt blend product.

The acid functionalized polypropylene wax of the present disclosure can include any material having the desired acid number (AN) and the desired melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, Pa·s taken via the DIN 53019 Method (2010) at 170° C. for a polymer wherein more than 50 wt. % of the polymer comprises propylene in polymerized form that can improve compatibility between the acid functionalized polypropylene base polymer and acid functionalized polyolefin of the present disclosure. The melt index of the acid functionalized polypropylene wax will be significantly higher than the corresponding measure for both the polypropylene copolymer and the acid functionalized polypropylene base polymer, and may be so high that viscosity may be a better practical measure to define the acid functionalized polypropylene wax.

Suitable acid functionalized polypropylene wax may comprise an acid functional modified polypropylene, preferably, a maleic anhydride polypropylene copolymer, maleic anhydride grafted polypropylene, or a maleic anhydride modified polypropylene wax.

The acid functionalized polypropylene wax can be any modified polyolefin having an acid number (AN) of from 10 to 70, less than 60 or, 35-55 and a melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, mPa·s taken via the DIN 53019 method (2010) measured at 140° C. for a polymer wherein more than 50 wt. % of the polymer comprises ethylene in polymerized form and measured at 170° C. for a polymer wherein more than 50 wt. % of the polymer comprises propylene in polymerized form.

The acid functionalized polypropylene wax of the present disclosure may include acid or anhydride modified polypropylene. For example, acid functionalized polypropylene waxes can be selected from the group consisting of an acid functionalized polypropylene homopolymer, a copolymer that has been modified with carboxylic acid groups, a copolymer that has been modified with anhydride groups and a combination thereof.

Other suitable acid functionalized polypropylene waxes can include modified polypropylene graft copolymers and/or block copolymers, such as propylene-maleic anhydride graft copolymers.

Specific examples of modified polypropylenes useful as acid functionalized polypropylene waxes may include, for example, maleic anhydride functionalized polypropylenes, copolymers of propylene and ethylene, and combinations thereof. Examples include, but are not limited to maleic anhydride functionalized polypropylene, such as high density polypropylene including a high density homopolymer, maleic anhydride functionalized polypropylene copolymers, terpolymers and blends may also be used. Maleic anhydride functionality can be incorporated into the polymer by grafting or other reaction methods. When grafting, the level of acid or incorporation is below 10 wt. %, such as less than 5 wt. %, based on the weight of the polymer.

Commercially available examples of suitable modified polypropylene include, but are not limited to, the polymers sold under the trade name LICOCENE™, or LICOLUBE™, from Clariant Corporation (Fair Lawn, N.J.), such as LICOCENE™ 641 (e.g., LICOCENE™ PP MA 641) and LICOCENE™ 6452 (e.g., LICOCENE™ PP MA 6452), the polymers sold under the trade name EPOLENE™ E-43P polymer, among others, available from Westlake Chemical.

The aqueous dispersion can also, optionally, include 0.1 to 10 wt. % of a polyethylene wax, where the wt. % is based on the total weight of the melt blend product. All individual values and subranges from 0.1 to 10 wt. % based on the total weight of the melt blend product of the aqueous dispersion are included herein and disclosed herein. For example, the polyethylene wax can be from a lower limit of 0.1, 0.2 or 0.5 wt. % based on the total weight of the melt blend product of the aqueous dispersion to an upper limit of 2.5, 5, or 10 wt. % based on the total weight of the melt blend product of the aqueous dispersion. For example, the melt blend product of the aqueous dispersion can comprise from 0.2 to 5 wt. % of the polyethylene wax or from 0.5 to 2.5 wt. % of the polyethylene wax.

The polyethylene wax is a different wax than the acid functionalized polypropylene wax. Examples of the polyethylene wax include, but are not limited to both polyethylene waxes and polyethylene-propylene waxes preferably having a number average molecular weight from 500 to 70,000. The polyethylene wax has an acid number (AN) of from 0 to 10, 0 to 5 or from 0-2, where values of less than 1 are preferred.

Acid Functionalized Polyolefin

Embodiments of the present disclosure provide that the melt blend product of the aqueous dispersion further includes 5 to 30 wt. % of an acid functionalized polyolefin, where the wt. % is based on the total weight of the melt blend product. All individual values and subranges from 5 to 30 wt. % based on the total weight of the melt blend product of the aqueous dispersion are included herein and disclosed herein. For example, the acid functionalized polyolefin can be from a lower limit of 5, 15, or 19 wt. % based on the total weight of the melt blend product of the aqueous dispersion to an upper limit of 20, 25, or 30 wt. % based on the total weight of the melt blend product of the aqueous dispersion. For example, the melt blend product of the aqueous dispersion can comprise from 15 to 25 wt. % of the acid functionalized polyolefin, or from 18 to 23 wt. % of the acid functionalized polyolefin, where the wt. % is based on the total weight of the melt blend product.

Suitable acid functionalized polyolefins may be, for example, any unneutralized, partially or fully neutralized copolymers of alpha-olefin and any carboxylic acid, salt or anhydride group containing monomers with an unsaturated bond where the acid functionalized polyolefin has an acid number of 80 or more, or 110 or more, or, 140 or more and up to 250, such as ethylene acrylic acid copolymer, ethylene methacrylic acid copolymer and/or acid modified polyolefin such as maleic anhydride grafted polyolefin, and/or blends thereof.

The acid functionalized polyolefins of the present disclosure can include one or more polar polyolefins, e.g., having a polar group as either a comonomer or grafted monomer.

The acid functionalized polyolefins can include, but is not limited to, amphiphilic copolymer compositions, the copolymer including the reaction product of from 5 to 95 wt. % of one or more acid functional monomers and from 5 to 95 wt. % of one or more copolymerizable ethylenically unsaturated hydrophobic monomers, such as an alpha olefin. These materials can be water soluble and/or emulsifiable, for example upon neutralization and can act as colloidal stabilizers.

Acid-functional monomers useful for production of the acid functionalized polyolefins compositions include, but are not limited to, ethylenically unsaturated monomers containing carboxylic acid, phosphonic acid, phosphinic acid, sulfonic acid, sulfonic acid groups, and anhydrides that are subsequently hydrolyzed. Suitable examples include (meth)acrylic acid, maleic acid, fumaric acid, itaconic acid, vinyl phosphonic acid, phosphoethyl(meth)acrylate, and vinylsulfonic acid. The acid functionalized polyolefins may be any unneutralized, partially or fully neutralized acid functional olefin copolymer dispersing agents, such as carboxylic acid functional olefin copolymers like ethylene/(meth)acrylic acid copolymers like those available as NUCREL™ (DuPont), or ESCOR™ (ExxonMobil) polymers.

Examples of suitable acid functionalized polyolefins include those derived from high density polyethylene, low density polyethylene, linear low density polyethylene, homogeneously branched linear ethylene/alpha-olefin interpolymers or homogeneously branched substantially linear ethylene/alpha-olefin interpolymers, and combinations thereof. High density polyethylene typically has a density of 0.94 to 0.97 g/cm$^3$. Low density polyethylene typically has a density from 0.91 to 0.94 g/cm$^3$.

The term interpolymer includes both copolymers and terpolymers. The ethylene/alpha-olefin interpolymers have comonomer(s) incorporation in the final polymer greater than 5 wt. %, preferably greater than 10 wt. %, based on the total weight of polymerizable monomers. The amount of comonomer(s) incorporation can be greater than 15 wt. %, and can even be greater than 20 or 25 wt. %, based on the total weight of polymerizable monomers.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically, the ethylene is copolymerized with one C3-C20 alpha-olefin. Preferred comonomers include propene, 1-butene, 1-pentene, 1-hexene, 1-heptene and 1-octene, and more preferably include propene, 1-butene, 1-hexene and 1-octene.

Illustrative interpolymers include ethylene/propylene copolymers, ethylene/butene copolymers, ethylene/hexene copolymers, ethylene/octene copolymers, ethylene/alpha-olefin/diene interpolymers, such as ethylene/propylene/diene interpolymers and ethylene/propylene/octene terpolymers.

The homogeneously branched linear ethylene/alpha-olefin interpolymers or homogeneously branched substantially linear ethylene/alpha-olefin interpolymers used in making acid functionalized polyolefins can have a melt flow index values from 0.01 g/10 min. to 30 g/10 min., preferably from 0.1 g/10 min. to 20 g/10 min., and more preferably from 0.1 g/10 min. to 15 g/10 min, where the melt from index values are determined ASTM D-1238 (190° C./2.16 kg load).

Additional examples of suitable acid functionalized polyolefins include those derived from propylene-based polymers, which include propylene homopolymers and propylene interpolymers. The propylene interpolymer can be a random or block copolymer, branched polypropylene, or a propylene-based terpolymer. Suitable comonomers for polymerizing with propylene include ethylene, 1-butene, 1-pentene, 1-hexene, 1-heptene, 1-octene, 1-nonene, 1-decene, 1-unidecene, 1dodecene, as well as 4-methyl-1-pentene, 4-methyl-1-hexene, 5-methyl-1-hexene, vinylcyclohexane, and styrene. Typically, and preferably, the propylene is copolymerized with ethylene or one C4-C20 alpha-olefin. The preferred comonomers include ethylene, 1-butene, 1-hexene, and 1-octene, and more preferably ethylene.

The propylene interpolymers of particular interest include propylene/ethylene, propylene/1-butene, propylene/1-hexene, propylene/4-methyl-1-pentene, propylene/l-octene, propylene/ethylene/1-butene, propylene/ethylene/ENB, propylene/ethylene/1-hexene, propylene/ethylene/1-octene, propylene/styrene, and propylene/ethylene/styrene.

The polypropylene homopolymers or propylene/alpha-olefin interpolymers used in making the acid functionalized polyolefins of the present disclosure can have a melt flow index less than 100 g/10 min., and more preferably less than, or equal to 50 g/10 min., and even more preferably less than, or equal to 30 g/10 min, as determined by ASTM D-1238 (230° C./2.16 kg load).

Polypropylene polymers include VERSIFY™ polymers available from The Dow Chemical Company, and VISTAMAXX™ polymers available from ExxonMobil Chemical Co., LICOCENE™ polymers available from Clariant, EASTOFLEX™ polymers available from Eastman Chemical Co., REXTAC™ polymers available from Huntsman, and VESTOPLAST™ polymers available from Evonik. Other polymers include propylene-alpha-olefins block copolymers and interpolymers, and other propylene based block copolymers and interpolymers known in the art.

In another embodiment, the propylene polymers comprise units derived from propylene in an amount of at least about 60, preferably at least about 80 and more preferably at least about 85, wt. % of the interpolymer (based on the total weight of polymerizable monomers). The typical amounts of units derived from ethylene in propylene/ethylene copolymers is at least about 0.1, preferably at least about 1 and more preferably at least about 5 wt. %, and the maximum amounts of units derived from ethylene present in these copolymers is typically not in excess of about 35, preferably not in excess of about 30 and more preferably not in excess of about 20, wt. % of the interpolymer (based on the total weight of polymerizable monomers). The amount of units derived from an additional unsaturated comonomer(s), if present, is typically at least about 0.01, preferably at least about 1 and more preferably at least about 5, wt. %, and the typical maximum amount of units derived from the unsaturated comonomer(s) typically does not exceed about 35, preferably it does not exceed about 30 and more preferably it does not exceed about 20, wt. % of the interpolymer (based on the total weight of polymerizable monomers). The combined total of units derived from ethylene and any unsaturated comonomer(s) typically does not exceed about 40, preferably it does not exceed about 30, and more preferably it does not exceed about 20, wt. % of the interpolymer (based on the total weight of polymerizable monomers).

In another embodiment, the propylene polymers comprise propylene and one or more unsaturated comonomers, other than ethylene, also typically comprise units derived from propylene in an amount of at least about 60, preferably at least about 70 and more preferably at least about 80, wt. % of the interpolymer (based on the total weight of polymerizable monomers). The one or more unsaturated comonomers of the copolymer comprise at least about 0.1, preferably at least about 1, and more preferably at least about 3, wt. %, and the typical maximum amount of unsaturated comonomer does not exceed about 40, and preferably it does not exceed about 30, wt. % of the interpolymer (based on the total weight of polymerizable monomers).

In another embodiment of the present disclosure, a blend of two of more polyolefins may be used as the olefin polymer component in forming the acid functionalized polyolefin, such as, for example, a blend of an ethylene-base polymer, as discussed above, and a propylene-base polymer, as discussed above.

Examples of reactive compounds that can be grafted or copolymerized onto the polymeric hydrocarbon backbone in forming the acid functionalized polyolefin include ethylenically unsaturated carboxylic acids such as maleic acid, fumaric acid, itaconic acid, acrylic acid, methacrylic acid, and crotonic acid; acid anhydrides such as maleic anhydride and itaconic anhydride. Preferred ethylenically unsaturated compounds include maleic anhydride, acrylic acid, methacrylic acid, with maleic anhydride being more preferred. Polypropylene grafted with maleic anhydride is a more preferred modified polymeric hydrocarbon.

A thermal grafting process is one method for reaction; however, other grafting processes may be used, such as photo initiation, including different forms of radiation, e-beam, or redox radical generation. The functionalization may also occur at the terminal unsaturated group (for example, vinyl group) or an internal unsaturation group, when such groups are present in the polymer.

In accordance with some embodiments, the polymers with unsaturation are functionalized, for example, with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, that is, acid or anhydride or acid ester moieties, onto the polymer chains.

The carboxylic acid producing moieties can be grafted to the polymer by any conventional method, typically in the presence of a free radical initiator, for example peroxides and azo compounds, or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl alpha-cumyl peroxide, di-t-butyl peroxide, di-t-amyl peroxide, t-amyl peroxybenzoate, 1,1-bis(t-butylperoxy)-3,3,5-trimethylcyclohexane, alpha-alpha'-bis(t-butylperoxy)-1,3-diisopropylbenzene, alpha-alpha'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

The grafting reaction should be performed under conditions that maximize grafts onto the polyolefin backbone, and minimize side reactions, such as the homopolymerization of the grafting agent, which is not grafted to the polyolefin. The grafting reaction may be performed in the melt, in solution, in the solid-state, in a swollen-state, and is preferably performed in the melt. The grafting reaction may be performed in a wide-variety of equipment, such as, but not limited to, twin screw extruders, single screw extruders, Brabender mixers, and batch reactors. Mixing the resin with the grafting agent and initiator in the first stage of an extruder, at melt temperatures typically from 120° C. to 260° C., preferably from 130° C. to 250° C., has produced sufficiently grafted polymers.

In a preferred embodiment, the acid functionalized polyolefin is an ethylene-acrylic acid copolymer. In another preferred embodiment, the acid functionalized polyolefin is an ethylene-methacrylic acid copolymer. Commercially available examples of acid functionalized polyolefins include, but are not limited to, polymers under the tradename PRIMACOR™, such as PRIMACOR™ 5980i, commercially available from SK Chemicals, NUCREL™, commercially available from DowDupont Inc., and ESCOR™, commercially available from ExxonMobil Chemical Company. Other examples of acid functionalized polyolefins include, but are not limited to, ethylene-ethyl-acrylate copolymer, ethylene-methyl-methacrylate, ethylene-butyl acrylate, and combinations thereof. Other ethylene-carboxylic acid copolymer may also be used.

As discussed above, embodiments of the present disclosure include an aqueous dispersion that includes a solid content from 15 wt. % to 60 wt. % based on a total weight of the aqueous dispersion. The solid content of the aqueous dispersion includes a melt blend product having 15 to 60 wt. % of an acid functionalized polypropylene base polymer having a melting point of 155° C. to 170° C., 16 to 50 wt. % of a polypropylene copolymer having a density of less than 0.88 grams/cubic centimeter (g/cm$^3$), 5 to 20 wt. % of an acid functionalized polypropylene wax, and 15 to 30 wt. % of an acid functionalized polyolefin, where the wt. % is based on the total weight of the melt blend product and components of the melt blend product add to 100%.

The aqueous dispersion includes a fluid medium, which is preferably water. The aqueous dispersion can comprise 40 wt. % to 85 wt. % of water based on a total weight of the aqueous dispersion. All individual values and subranges from 40 to 85 wt. % based on the total weight of the aqueous dispersion are included herein and disclosed herein. For example, the water in the aqueous dispersion can have a lower limit of 40, 45, 50 or 55 wt. % based on the total weight of the aqueous dispersion to an upper limit of 85, 80, 75 or 70 wt. % based on the total weight of the aqueous dispersion. For example, the water of the aqueous dispersion can comprise from 45 to 80 wt. % of the aqueous dispersion, from 50 to 75 wt. % of the aqueous dispersion or from 55 to 70 wt. % of the aqueous dispersion, where the wt. % is based on the total weight of the aqueous dispersion.

Accordingly, the aqueous dispersion can comprise a solids content that is from 15 wt. % to 60 wt. % based on a total weight of the aqueous dispersion. As noted herein, the solid content of the aqueous dispersion is provided from the melt blend product. All individual values and subranges from 15 to 60 wt. % based on the total weight of the aqueous dispersion are included herein and disclosed herein. For example, the solid content of the aqueous dispersion can have a lower limit of 15, 20, 25 or 30 wt. % based on the total weight of the aqueous dispersion to an upper limit of 60, 55, 50 or 45 wt. % based on the total weight of the aqueous dispersion. For example, the solid content of the aqueous dispersion can comprise from 20 to 55 wt. % of the aqueous dispersion, from 25 to 50 wt. % of the aqueous dispersion or from 30 to 45 wt. % of the aqueous dispersion, where the wt. % is based on the total weight of the aqueous dispersion.

According to a number of embodiments of the present disclosure, the aqueous dispersion can comprise a neutralizing agent, e.g., such that the aqueous dispersion has a pH in a range from 8 to 11. All individual values and subranges from 8 to 11 are included herein and disclosed herein. For example, the aqueous dispersion can have a pH from a lower limit of 8, 8.1, 8.2, or 8.3 to an upper limit of 11, 10.9, 10.8, or 10.7. For example, the aqueous dispersion can have a pH from 8 to 11, 8.1 to 10.9, 8.2 to 10.8, or 8.3 to 10.7. Examples of the neutralizing agent include, but are not limited to, hydroxides, carbonates, hydrogen carbonates, amines, and combinations thereof. Examples of hydroxides include, but are not limited to, ammonium hydroxide, potassium hydroxide, lithium hydroxide, and sodium hydroxide. Examples of carbonates include, but are not limited to sodium carbonate, sodium bicarbonate, potassium carbonate, and calcium carbonate. Examples of amines include, but are not limited to monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1,2-diaminopropane, 2-amino-2-hydroxymethyl-1,3-propanediol, N,N'-ethylenebis[bis(2-hydroxypropyl)amine]toluene-p-sulphonate, or cyclic amines such as morpholine, piperazine, piperidine, and combinations thereof.

As an example, the aqueous dispersion can comprise a basic water composition. The basic water composition can comprise from 90 to 99.99 wt. % of water based on a total weight of the basic water composition and from 0.01 percent to 10 wt. % of a neutralizing agent, as discussed herein, based on the total weight of the basic water composition. Embodiments of the present disclosure provide that the basic water composition is from 0 wt. % to 85 wt. % of the dispersion composition based on the total weight of the dispersion composition.

The aqueous dispersions can be formed by various processes recognized by those having skill in the art. Embodiments provide that the acid functionalized polypropylene base polymer, the polypropylene copolymer, the acid functionalized polypropylene wax, and the acid functionalized polyolefin are melt-kneaded in an extruder, e.g. via an extruder based BLUEWAVE™ process (The Dow Chemical Company), to form the melt blend product. Water is used during the extrusion process to form the aqueous dispersion, as discussed herein. In a number of embodiments, the melt blend product is first converted to an aqueous dispersion containing about 1 to about 3% by weight water and then, subsequently, further diluted to comprise greater than about 25% by weight water. Optionally, a neutralizing agent, e.g., a base, such as ammonia, potassium hydroxide, or a combination thereof can be utilized with the water in forming the aqueous dispersion.

Various melt-kneading processes known in the art may also be used in forming the melt blend product. In some embodiments, a kneader, a BANBURY® mixer, single-screw extruder, or a multi-screw extruder, e.g., a twin screw extruder, may be utilized. A process for producing the aqueous dispersions in accordance with the present disclosure is not particularly limited. For example, an extruder, in certain embodiments, for example, a twin screw extruder, is coupled to a back pressure regulator, melt pump, or gear pump. Embodiments also provide an initial water reservoir that includes a pump. Desired amounts of initial water can be provided from the initial water reservoir.

In some embodiments, the initial water is preheated in a preheater. For example, in a number of embodiments, the acid functionalized polypropylene base polymer, the polypropylene copolymer, the acid functionalized polypropylene wax, and the acid functionalized polyolefin in the form of pellets, powder, or flakes, can be fed from feeders to an inlet of an extruder. In some embodiments, a dispersing agent can be added to the one or more of the acid functionalized polypropylene base polymer, the polypropylene copolymer, the acid functionalized polypropylene wax, and/or the acid functionalized polyolefin or, in other embodiments, a dispersing agent can be provided separately to the extruder. The melted polymers can then be delivered from the mix and convey zone to an emulsification zone of the extruder where an initial amount of water from the water reservoir is added through an inlet. In some embodiments, a dispersing agent may be added additionally or exclusively to the water stream. In some embodiments, further dilution water may be added via water inlet from a water reservoir to a dilution and cooling zone of the extruder. The aqueous dispersion can be diluted, e.g., greater than about 25 wt. % water, in the cooling zone. Further dilution may occur a number of times until the desired dilution level is achieved. In some embodiments, water is not added into the twin screw extruder but rather to a stream containing the melt product after the melt product has exited from the extruder. In this manner, steam pressure build-up in the extruder is eliminated and the aqueous dispersion is formed in a secondary mixing device such as a rotor stator mixer.

In one or more embodiments, a process for producing the aqueous dispersion comprises the steps of selecting an acid functionalized polypropylene base polymer having a melting point of 155° C. to 170° C.; selecting a polypropylene copolymer having a density of less than 0.88 grams/cubic centimeter (g/cm$^3$); selecting an acid functionalized polypropylene wax; selecting an acid functionalized polyolefin; selecting an aqueous composition comprising water; optionally selecting one or more neutralizing agents; melt-blending the acid functionalized polypropylene base polymer, the polypropylene copolymer, the acid functionalized polypropylene wax, the acid functionalized polyolefin in the presence of the aqueous composition and optionally one or more neutralizing agents; thereby forming an emulsified mixture; contacting the emulsified mixture with additional dilution water while optionally removing heat therefrom; thereby forming solid particles dispersed in the water; and thereby forming the aqueous dispersion.

The aqueous dispersion, e.g., the solid content, can have a volume average particle size diameter in the range of from 200 to 5000 nanometers (nm). All individual values and subranges from 200 to 5000 nm are included herein and disclosed herein. For example, the aqueous dispersion can have an average volume particle size diameter from a lower limit of 200, 400, 425, or 450 nm to an upper limit of 5000, 3500, 2000, 1800, or 1750 nm. For example, the aqueous dispersion can have an average volume particle size diameter from 200 to 5000 nm, 425 to 3800 nm, or 450 to 1750 nm.

Embodiments of the present disclosure provide that the aqueous dispersion disclosed herein can be used by itself as a coating composition or combined with, as discussed herein, optionally one or more other components to form the coating compositions. The aqueous dispersion and one or more other components of the coating compositions, discussed further herein, can be combined by various processes. For example, the aqueous dispersion and other components of the coating compositions can be mixed manually, by utilizing a mixer such static mixer, also referred as in-line mixers, and/or by utilizing an agitated vessel, such as an agitated tank to form the coating compositions disclosed herein, among other processes.

The present disclosure also provides for a coating composition that includes 15 to 100 wt. % of the aqueous dispersion, as provided herein, based on total weight of the coating composition; a solvent, where the solvent is from 0 wt. % to 80 wt. % based on the solid content of the aqueous dispersion, as provided herein, used to make the coating composition; a crosslinker, where the crosslinker is from 0 wt. % to 6 wt. % based on the solid content of the aqueous dispersion, as provided herein, used to make the coating composition; and a basic water composition comprising from 90 to 99.99 wt. % of water based on a total weight of the basic water composition and from 0.01 percent to 10 wt. % of a base based on the total weight of the basic water composition, where the basic water composition is from 0 wt. % to 85 wt. % of the coating composition based on the total weight of the coating composition.

The coating composition includes 15 to 100 wt. % of the aqueous dispersion, as provided herein, based on total weight of the coating composition. All individual values and subranges from 15 to 100 wt. % of the aqueous dispersion, as provided herein, based on total weight of the coating composition are included herein and disclosed herein. For example, the aqueous dispersion, as provided herein, can be present in the coating composition from a lower limit of 15, 20, 25 or 30 wt. % to an upper limit of 70, 80, 90 or 100 wt. % based on total weight of the coating composition. For example, the aqueous dispersion can comprise from 15 to 70; 15 to 80; 15 to 90; 15 to 100; 20 to 70; 20 to 80; 20 to 90; 20 to 100; 25 to 70; 25 to 80; 25 to 90; 25 to 100; 30 to 70; 30 to 80; 30 to 90; or 30 to 100; wt. % based on total weight of the coating composition.

For the various embodiments the solvent can be selected from the group of ethylene glycol, n-butyl ethylene glycol ether, diethylene glycol monoethyl ether, propylene glycol, dipropylene glycol dimethyl ether, propylene glycol methyl ether, n-butanol, ethanol, dipropylene glycol methyl ether, and combinations thereof. Other solvents include, but are not limited to 2,2,4-trimethyl-1,3-pentanediol monoisobutyrate, mineral spirits, alcohols, and benzoate esters or the like.

The solvent can comprise from 0 wt. % to 80 wt. % based on the solid content of the aqueous dispersion used in forming the coating composition. All individual values and subranges from 0 to 80 wt. % based on the solid content of the aqueous dispersion are included herein and disclosed herein. For example, the solvent can be present in the coating composition from a lower limit of 0, 1, 5, 10, 15 or 20 wt. % to an upper limit of 50, 60, 70 or 80 wt. % based on the solid content of the aqueous dispersion used in forming the coating composition. For example, the solvent can comprise from 0 to 50; 0 to 60 or 0 to 70; 1 to 50; 1 to 60; 1 to 70; 1 to 80; 5 to 50; 5 to 60; 5 to 70; 5 to 80; 10 to 50; 10 to 60; 10 to 70; 10 to 80; 15 to 50; 15 to 60; 15 to 70; 15 to 80; 20 to 50; 20 to 60; 20 to 70; or 20 to 80 wt. % based on the solid content of the aqueous dispersion used in forming the coating composition.

The basic water composition includes water and a neutralizing agent. Specifically, the basic water composition can comprise from 90 to 99.99 wt. % of water based on a total weight of the basic water composition. All individual values and subranges from 90 to 99.99 wt. % of water based on a total weight of the basic water composition are included herein and disclosed herein. For example, the wt. % of water based on a total weight of the basic water composition can be from a lower limit of 90, 90.5, 91, or 93 to an upper limit of 99.99, 99.9, 99, or 98 percent. For example, the basic water composition can comprise from 90 to 99.99, 90.5 to 99.9, 91 to 99, or 93 to 98 wt. % of water based on a total weight of the basic water composition.

The basic water composition further includes from 0.01 to 10 wt. % of a neutralizing agent based on the total weight of the basic water composition. The basic water composition includes a neutralizing agent. Examples of the neutralizing agent include, but are not limited to, those neutralizing agents discussed herein. All individual values and subranges from 0.01 to 10 wt. % of the neutralizing agent based on a total weight of the basic water composition are included herein and disclosed herein. For example, the wt. % of the neutralizing agent based on a total weight of the basic water composition can be from a lower limit of 0.01, 0.1, 1, or 2 to an upper limit of 10, 9.5, 9, or 7 percent. For example, the basic water composition can comprise from 0.01 to 10, 0.1 to 9.5, 1 to 9, or 2 to 7 wt. % of the neutralizing agent based on a total weight of the basic water composition.

The coating compositions disclosed herein can comprise a crosslinker. Preferably, the crosslinker can be from 0 to 6 wt. % of the coating composition based on the solid content of the aqueous dispersion used in forming the coating composition. All individual values and subranges from 0 to 6 wt. % are included herein and disclosed herein. For example, the crosslinker can be from a lower limit of 0, 0.01, 0.02, 0.1 or 1, to an upper limit of 2, 3, 4, 5 or 6 wt. % based on the solid content of the aqueous dispersion used in forming the coating composition. For example, the crosslinker can be from 0 to 2; 0 to 3; 0 to 4; 0 to 5; 0.01 to 2; 0.01 to 3; 0.01 to 4; 0.01 to 5; 0.01 to 6; 0.02 to 2; 0.02 to 3; 0.02 to 4; 0.02 to 5; 0.02 to 6; 0.1 to 2; 0.1 to 3; 0.1 to 4; 0.1 to 5; 0.1 to 6; 1 to 2; 1 to 3; 1 to 4; 1 to 5; or 1 to 6 wt. % based on the solid content of the aqueous dispersion used in forming the coating composition. Preferably, the crosslinker used with the above recited amounts is a hydroxyalkylamide, examples of which are provided herein.

It is also possible for the coating compositions disclosed herein to have other amounts of the crosslinker. For example, the crosslinker can be from 0 to 40 wt. % of the coating composition based on the total weight of the coating composition. All individual values and subranges from 0 to 40 wt. % are included herein and disclosed herein. For example, the crosslinker can be from a lower limit of 0, 1, 2, 10 or 15, to an upper limit of 20, 25, 30, 35 or 40 wt. % based on the solid content of the aqueous dispersion used in forming the coating composition. For example, the crosslinker can be from 0 to 20; 0 to 25; 0 to 30; 0 to 35; 0 to 40; 1 to 20; 1 to 25; 1 to 30; 1 to 35; 1 to 40; 2 to 20; 2 to 25; 2 to 30; 2 to 35; 2 to 40; 10 to 20; 10 to 25; 10 to 30; 10 to 35; 10 to 40; 15 to 20; 15 to 25; 15 to 30; 15 to 35 or 10 to 40 wt. % of the coating composition based on the total weight of the coating composition.

Embodiments of the present disclosure provide that the crosslinker may be a compound, which reacts with a reactive functional group contained in the coating composition; thereby facilitating the crosslinking between such functional groups. Such functional groups can be present in components of the aqueous dispersion, for example in the acid functionalized polypropylene base polymer, the acid functionalized polypropylene wax and/or the acid functionalized polyolefin. For example, reactive functional groups include, but are not limited to, acid groups such as carboxylic acid groups, free or in the neutralized form, or any functional groups having another active hydrogen by another component such as alcohol groups, amino groups, or the like.

Crosslinkable functional groups in the crosslinker are groups capable of reacting with the reactive functional groups of the coating compositions. For example, a carbodiimide group, an oxazoline group, an isocyanate group, a hydroxyalkyl amide group, an epoxy group, a methylol group, an aldehyde group, an acid anhydride group, a hydroxy group, an aziridinyl group, and/or a silane group can be for the crosslinker.

Another possibility of crosslinking acid functional groups is by use of multivalent metal ions by reaction of the aforementioned acid groups with a multivalent metal ion containing substance, such as zinc oxide. Carboxylic acids could also be crosslinked in reactions with multifunctional olefinic unsaturated substances under catalysis of a strong acid. Multifunctional carbonates could also react with carboxylic acids to give ester linkages with liberation of carbon dioxide. Also, polyolefinic materials may be crosslinked via free radical crosslinking, initiated by addition of peroxides or via radiation, e.g., electron beam.

According to a number of embodiments the crosslinker comprises phenol-formaldehyde resins; hydroxyalkyl amide resins; amino-formaldehyde resins including, but not limited to, urea-formaldehyde resins, melamine formaldehyde resins, benzoguanamine formaldehyde resins, anhydride resins; epoxy group containing resins, including, but not limited to, epoxy resins, epoxy group containing polyester or acrylic resins, epoxidized unsaturated compounds such as epoxidized soy bean oil and blocked isocyanate resins, and combinations of two or more thereof, provided that the combinations of such crosslinkers is compatible.

The crosslinker may be a water dispersed, water dispersible, or water-soluble substance. According to a number of embodiments, examples of the crosslinker include, but are not limited to, an aqueous monomeric or polymeric substance, which contains two or more oxazoline groups, carbodiimide groups, hydroxyalkyl amide groups, epoxy groups, isocyanate groups, methylol groups etc. or several of these per molecule.

An example of an oxazoline crosslinker is an aqueous polymer having two or more oxazoline groups in its molecules, which can be obtained by polymerizing an oxazoline group-containing monomer and, as required, an ethylenic unsaturated monomer. Alternatively, an oxazoline crosslinker can also be obtained by reaction between a nitrile group and an aminoethanol group, dehydration of a hydroxylalkylamide group and the like.

Crosslinkers having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures. Monofunctional isocyanates may be included, e.g., to control the resin molecular chain length, such as phenyl isocyanate, tolyl isocyanate, cyclohexylisocyanate, dimethylphenyl isocyanate, butylisocyanate, and naphthyl isocyanate are useful. Diisocyanate substances may be partially reacted with aliphatic compounds, alicyclic compounds, or aromatic compounds having a hydroxyl group, an imino group, an amino group, a carboxyl group, a mercapto group, an epoxy group, and the like. In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

To convert a carbodiimide group-containing polymer into an aqueous polymer, a hydrophilic segment can be provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxygroup or an ethoxy group).

The crosslinker, e.g. an aqueous crosslinker, may contain an epoxy group; examples include, but are not limited to, sorbitol polyglycidyl ether, glycerol triglycidyl ether, polyglycerol polyglycidyl ether, trimethylolpropane triglycidyl ether, polyethyleneglycol)diglycidyl ether, poly(propyleneglycol)diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules.

Examples of the anhydride compound include, but are not limited to, aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac, bisphenol A, bisphenol F, bisphenol S, resorcinol, hydroquinone or catechin; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

The crosslinker, e.g. an aqueous crosslinker, containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, a urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of the crosslinker derived from aldehyde are water-dispersed or water-dispersible or water-soluble phenol formaldehyde resins, amino formaldehyde resins or combinations thereof.

Phenol formaldehyde crosslinkers include, but are not limited to, reaction products of the following aldehydes with the following phenolic resins Examples of aldehdyes include, but are not limited to, formaldehyde and acetaldehyde. Various phenols can be used such as, but not limited to, phenol, cresol, p-phenylphenol, p-tert-butylphenol, p-tert-amylphenol, cyclopentylphenol, cresylic acid, bisphenol-A, bisphenol-F, and the like, and combinations thereof. Examples of commercially available phenol formaldehyde crosslinkers include resole-formaldehyde resins, such as BAKELITE™ 6581LB, available from Bakelite A.G, and PHENODUR™ PR 612, available from CYTEC Industries, among others. Also, acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinkers include, but are not limited to, reaction products of aldehydes with amino or amido group containing molecules. Examples of aldehydes include, but are not limited to, formaldehyde and acetaldehyde. Various amino or amido group containing molecules can be used such as, but not limited to, urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Examples of commercially available amino-formaldehyde resins which are water soluble or water dispersible and useful for the instant purpose include Cymel™ 301, Cymel™ 303, Cymel™ 370, and Cymel™ 373, from Cytec Surface Specialties. Other aldehydes used to react with the amino compound to form the resinous material are crotonic aldehyde, acrolein, or compounds which generate aldehydes, such as hexamethylene-tetramine, paraldehyde, and the like.

A number of embodiments provide that the crosslinker comprises a hydroxyalkyl amide. The crosslinkers can be water-soluble and be employed to crosslink carboxylic acid. Examples of hydroxyalkyl amides include, but are not limited to, Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260.

A number of embodiments provide that one or more crosslinkers may be added to the aqueous dispersion as part of the aqueous dispersion formulation process; or in the alternative, a number of embodiments provide that one or more crosslinkers may be added to the coating composition, e.g. the crosslinker may be added to the aqueous dispersion after the dispersion formulation process.

Depending on the coating application, e.g., the type of food and/or beverage that is to be contained in a coated container, and on desired coating properties it may be beneficial to combine several crosslinkers. Also, for some coating applications some crosslinkers may be more suited than others. Some crosslinkers may not be suited for particular coating applications. Some crosslinkers may be employed with the addition of catalysts for curing. Crosslinkers can help to build thermoset networks which are indicated by higher values of MEK Double Rubs, e.g., as compared to an identical coating composition not containing the crosslinker.

Embodiments of the present disclosure provide that the coating composition can include an additive. Examples of the additive include, but are not limited to, antioxidants, fillers, catalysts, wetting agents, defoamers, flow agents, release agents, slip agents, lubricants, anti-blocking agents, additives to mask sulfur staining, pigment wetting/dispersion agents, anti-settling agents, UV stabilizers, adhesion promoters, corrosion inhibitors, pigments, e.g. titanium dioxide, mica, calcium carbonate, barium sulfate, silica, zinc oxide, milled glass, aluminum trihydrate, talc, antimony trioxide, fly ash, and clay or the like; optionally one or more dispersants, e.g. amino alcohols, and polycarboxylates, optionally one or more defoamers, optionally one or more preservatives, e.g. biocides, mildewcides, fungicides, algaecides, and combinations thereof, optionally one or more thickeners, e.g. cellulosic based thickeners such as hydroxyethyl cellulose, hydrophobically modified alkali soluble emulsions, hydrophobically modified ethoxylated urethane thickeners, and combinations thereof, among other additives. Different amounts of the various additives may be utilized for different coating applications.

As mentioned, the coating compositions disclosed herein may be applied to a metal substrate. Examples of the metal substrate include, but are not limited to, metal sheet or coil, beverage cans, food cans; aerosol containers such as those for non-food products, e.g. hair spray, hair dye, or color spray lacquers; drums; kegs; pails; decorative tins; open trays; tubes; bottles; monoblocs; caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans, among others. Cans, to which the coating compositions disclosed herein may be applied, can be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have various shapes. For example, such can may have a cylindrical shape, cubical, spherical, semi-spherical, bottle shape, elongated cubical shape, shallow or tall shape, round or rectangular shape or other suitable shape, or a combination thereof. Examples of the metal include, but are not limited to, aluminum and aluminum alloys, steel, electrolytic tinplate cold rolled low carbon mild steel, electrolytic chromium/chromium oxide coated cold rolled low carbon mild steel, and other pre-treated steels. Pretreatment may include, but is not limited to, treatment with phosphoric acid, zirconium phosphate, chromium phosphate, Cr (III) and Cr (VI) compounds and the like as well as silanes for reasons such as primary corrosion protection and improved adhesion. The metal substrate may comprise a sheet, strip or a coil. The substrate may be pre-coated with one or more pre-coating compositions. Such pre-coating compositions include, but are not limited to, one or more resin binders, one or more resin crosslinkers, one or more solvents, one or more additives, and one or more pigments. Examples of resin binders include, but are not limited to, epoxy, polyester, polyvinyl chloride containing organosols/vinyls, phenolic, alkyd, oleoresin, acrylic resin, and the like. Examples crosslinkers include, but are not limited to hydroxyalkylamide, phenolformaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Examples of solvents and thinners include, but are not limited to, glycol ethers, alcohols, aromatics, e.g. aromatic hydrocarbons, white spirit, branched ketones and esters. Examples of additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal substrate.

The metal substrate may be formed via stamping, drawing, redrawing, wall ironing, bending, beading, embossing, debossing, flanging, necking, stretching, blow-stretching and/or other suitable conventional methods. Such methods are known to those having ordinary skill in the art. According to a number of embodiments, the coating compositions may, for example, be applied to the metal substrate, e.g. metal sheet or metal foil, and then the coated substrate may be formed into a coated article, e.g., a container device such as metal can or a coated closure device. According to a number of embodiments, the substrate may be formed into a container, e.g., a container device or a closure device, and then the container device or the closure device can be coated with the coating compositions to form the coated article. The coating compositions may be applied by various methods. For example, via roller coating, spray coating, powder coating, dip coating, electrodeposition coating, printing, wash coating, flow coating, draw down coating, and/or curtain coating. The coating, i.e. the coating composition applied to the metal substrate, may have a thickness in the range of 0.01 micrometers (μm) to 2 millimeters (mm). All individual values and subranges from 0.01 μm to 2 mm are included herein and disclosed herein. For example, the coating may have a thickness from a lower limit of 0.01 μm, 0.05 μm, or 1 μm, to an upper limit of 2 mm, 1.5 mm, or 1 mm. For example, the coating may have a thickness 0.01 μm to 2 mm; 0.05 μm to 1.5 mm; or in the alternative, 0.1 μm to 1 mm. According to a number of embodiments, the coating may have a thickness in a range of 5 μm to 50 μm. Coatings may also be put on top of each other as a multilayer coating.

The coating composition applied to the substrate may be cured, e.g., to form a cured coating. The curing process can comprise drying, e.g., air drying, convection oven drying, hot air drying, and/or infrared oven drying, among others. According to a number of embodiments, the curing can include radiation cure, e.g. electron-beam cure. The coating compositions applied to the substrate may be cured at a temperature in the range of 10° C. to 375° C. for a period of less than 60 minutes, for example, less than 40 minutes, less than 30 minutes, less than 20 minutes, less than 10 minutes, less than 5 minutes, less than 2 minutes, less than 1 minute, or less than 20 seconds. All individual values and subranges from 10° C. to 375° C. are included herein and disclosed herein. For example, the coating compositions applied to the substrate may be cured at a temperature in the range of 15° C. to 260° C. for a period of less than 60 minutes, for example, less than 40 minutes, less than 20 minutes, less than 10 minutes, less than 5 minutes, less than 2 minutes, or less than 1 minute, or in the alternative, the coating composition applied to the substrate may be cured at a temperature in the range of 15° C. to 235° C. for a period of less than 60 minutes, for example, less than 40 minutes, less than 10 minutes, less than 5 minutes, less than 2 minutes, or less than 1 minute. The cured coating may have a thickness in the range of 0.01 μm to 2 millimeters mm. All individual values and subranges from 0.01 μm to 2 mm are included herein and disclosed herein. For example, the cured coating may have a thickness from a lower limit of 0.01 μm, 0.05 μm, or 1 μm, to an upper limit of 2 mm, 1.5 mm, or 1 mm. For example, the cured coating may have a thickness 0.01 μm to 2 mm; 0.05 μm to 1.5 mm; or in the alternative, 0.1 μm to 1 mm. According to a number of embodiments, the cured coating may have a thickness in a range of 1 μm to 50 μm.

As mentioned, for some coating applications, it is desirable that a coated article simultaneously provide particular performance characteristics, such as particular mechanical and chemical resistance properties and particular appearance properties. A particular mechanical property, desirable for some coating applications, is a Konig hardness value, e.g., Konig hardness values of greater than 70 seconds. Particular chemical resistance properties, desirable for some coating applications, include methyl ethyl ketone (MEK) double rub values, e.g., MEK double rub values of 200 or greater are desirable for some coating applications; passing appearance ratings following retort, e.g., 2% lactic acid solution, 3% acetic acid solution, and 3% citric acid solution.

EXAMPLES

In the Examples, various terms and designations for materials were used including, for example, the following:

TABLE 1

List of materials

| Material | Description/Source | Melting point (° C.) | Acid number (mg KOH/g) | Density (g/cm³) |
|---|---|---|---|---|
| Esenttia ™ 35R80 (PP35R80) | Polypropylene random copolymer/ Polipropileno del Caribe S.A. | 152 | 0 | 0.90 |
| Polypropylene H739-35N (H739) | Polypropylene/The Dow Chemical Company (TDCC) | 165 | 0 | 0.90 |
| FUSABOND ® P353D (P353) | Acid functionalized polypropylene/DuPont ™ | 144 | 13 | 0.90 |
| Morton ™ 899P (M899P) | Acid functionalized polypropylene/Morton International Inc. ("Morton") | 164 | 9 | 0.90 |
| Morton ™ 199P (M199P) | Acid functionalized polypropylene/Morton | 166 | 4 | 0.90 |
| Morton ™ 100P (M100P) | Acid functionalized polypropylene/Morton | 166 | 9 | 0.90 |

TABLE 1-continued

List of materials

| Material | Description/Source | Melting point (° C.) | Acid number (mg KOH/g) | Density (g/cm³) |
|---|---|---|---|---|
| FUSABOND ® P613 (P613) | Acid functionalized polypropylene/DuPont ™ | 167 | 4.5 | 0.90 |
| LICOCENE ® PP MA 7452 (L7452) | Acid functionalized polypropylene wax/Clariant | 152 | 43 | 0.91 |
| VERSIFY ™ 4200 (V4200) | Polypropylene copolymer/TDCC | 84 | 0 | 0.876 |
| LICOCENE ® PPMA 641 (L641) | Acid functionalized polypropylene wax/Clariant | 138 | 43 | 0.91 |
| PRIMACOR ® 5980i (P5980i) | Ethylene acrylic acid copolymer/TDCC | 77 | 145 | 0.958 |
| Polywax 655 (PW655) | Polyethylene wax/Baker Hughes | 99 | 0 | |

Additional materials used in the present Examples include solvents (n-butanol and n-butyl ethylene glycol ether available from Sigma Aldrich), base (dimethylethanolamine (DMEA), available from Huntsman) and crosslinker (hydroxyalkyl amide, Primid® QM-1260, available from EMS-GRILTECH).

Experimental

Coating Composition and Preparation

Prepare each Example and Comparative Example of the coating composition as seen in Table 2 as follows, where the weight percent (wt. %) values for each component of the melt blend product is provided in Table 2 as a wt. % based on the total weight of the melt blend product.

Example 1

Add M899P at 139 grams per minute, V4200 at 76 grams per minute, P5980i at 58 grams per minute and L641 at 30 grams per minute into a 25 mm diameter twin screw extruder using a controlled rate feeder to forward and melt blend the components. The extruder temperature profile was ramped up to approximately 160° C. Water and base (dimethylethanolamine/DMEA) as a neutralizing agent were fed to the extruder at 73 and 31 grams per minute respectively. Dilution water was fed via two separate pumps to two locations into a dilution zone of the extruder at a rate of 240 and 140 grams per minute, respectively. The extruder temperature profile was cooled back down to a temperature below 100° C. by the end of the extruder. The extruder speed was approximately 1200 rpm. At the extruder outlet, a backpressure regulator was used to adjust to a suitable pressure inside the extruder barrel to reduce steam formation. The resulting aqueous dispersion was filtered through 200, 50 and 20 micron filters in the subsequent order. After filtering, the aqueous dispersion had a solids content of 44 wt. % and a volume mean particle size of 2.0 microns. To prepare a coating composition, add 115.4 grams of the aqueous dispersion to a container, while stirring at 600 rotations per minute with a Cowles blade, add 61.6 gram of basic water (0.3 wt. % DMEA solution in water) to the contents of the first container over an interval of approximately one minute. Add 2.6 gram of 30 wt. % crosslinker solution in basic water. The crosslinker is Primid™ QM-1260, a hydroxyalkylamide compound derived from adipic acid and diisopropanolamine. The targeted loading of the crosslinker is 0.25 equivalence of the total acid functionality. Calculate the level of Primid QM-1260 according to the desired equivalence of the acid functionality using the following equation:

$$W = \frac{\sum_i A_i \omega_i}{56000} \times 94 \times 100 \times E$$

where W is the weight of Primid QM-1260 per 100 g resin blend. $A_i$ is acid number of the ith component in resin blend expressed in mg KOH/g, $\omega_i$ is weight fraction of the ith component, 94 is the equivalent molecular weight of Primid QM-1260 hydroxyl functionality and E is the design equivalence of Primid QM-1260. Add 20.5 gram of 1/1 mixture of n-butanol and ethylene glycol mono-butyl ether to the mixture. Stir for 10 minutes. The coating composition has a weight of 200 gram, a solid content of 26 wt. % and an organic solvent weight (excluding base) to dispersion solid content weight ratio of 0.4.

Example 2

The aqueous dispersion of Example 2 was prepared in the same manner as that in Example 1 with the exception that M199P was used instead of M899P and the feed rate of DMEA was 29.5 gram per minute. The aqueous dispersion had a solid content of 43.2 wt. % and a volume mean particle size of 1.3 micron. To prepare a coating composition of the same solid content, Primid QM-1260 equivalence and target solvent to dispersion solid ratio as the coating composition in Example 1, 118.6 gram of the aqueous dispersion, 58.4 gram of the basic water, 2.54 gram of Primid QM-1260 solution and 20.5 gram of solvent mixture were mixed in the same manner as in Example 1.

Example 3

The aqueous dispersion of Example 3 was prepared in the same manner as the one in Example 1 with the exception that M100P was used instead of M899P and the feed rates of initial water was 90.7 gram per minute. The aqueous dispersion had a solid content of 44.3 wt. % and a volume mean particle size of 1.7 micron. To prepare a coating composition of the same solid content, Primid QM-1260 equivalence and target solvent to dispersion solid ratio as the coating composition in Example 1, 115.7 gram of the aqueous dispersion, 61.3 gram of the basic water, 2.54 gram of Primid QM-1260 solution and 20.5 gram of solvent mixture were mixed in the same manner as in Example 1.

Example 4

The aqueous dispersion of Example 4 was prepared in the same manner as that in Example 1 with the exception that Fusabond P613 was used instead of M899P and the feed rates of initial water and DMEA were 90.7 and 28.9 grams per minute, respectively. The aqueous dispersion had a solid content of 42.7 wt. % and a volume mean particle size of 1.1 micron. To prepare a coating composition of the same solid content, Primid QM-1260 equivalence and target solvent to dispersion solid ratio as the coating composition in Example 1, 119.6 grams of the aqueous dispersion, 56.9 grams of the basic water, 3.1 grams of Primid QM-1260 solution and 20.4 grams of solvent mixture were mixed in the same manner as in Example 1.

Example 5

The aqueous dispersion of Example 5 was prepared in the same manner as that in Example 1 with the exception that P613 was used instead of M899P and the feed rates of P613, V4200, P5980i, L641, initial water, DMEA, dilution water 1 and dilution water 2 were 40.8, 12.9, 14.4, 7.6, 22.7, 7.5, 60 and 35 grams per minute, respectively and the extruder speed was 450 rotation per minute. The aqueous dispersion had a solid content of 42.1 wt. % and a volume mean particle size of 1.1 micron. To prepare a coating composition of the same solid content, Primid QM-1260 equivalence and target solvent to dispersion solid ratio as the coating composition in Example 1, 121.7 gram of the aqueous dispersion, 55.2 grams of the basic water, 2.6 grams of Primid QM-1260 solution and 20.5 grams of solvent mixture were mixed in the same manner as in Example 1.

Example 6

The aqueous dispersion of Example 6 was prepared in the same manner as that in Example 1 with the exception that P613 was used instead of M899P and the feed rates of P613, V4200, P5980i, L641, initial water, DMEA, dilution water 1 and dilution water 2 were 19.7, 34.0, 14.4, 7.6, 20.4, 7.2, 60 and 35 grams per minute, respectively, and the extruder speed was 350 rotations per minute. The aqueous dispersion had a solid content of 44.3 wt. % and a volume mean particle size of 0.8 micron. To prepare a coating composition of the same solid content, Primid QM-1260 equivalence and target solvent to dispersion solid ratio as the coating composition in Example 1, 115.7 gram of the aqueous dispersion, 61.3 grams of the basic water, 2.5 grams of Primid QM-1260 solution and 20.5 grams of solvent mixture were mixed in the same manner as in Example 1.

Example 7

The aqueous dispersion of Example 7 was prepared in the same manner as that in Example 1 with the exception that P613 was used instead of M899P and the feed rates of P613, V4200, P5980i, L641, initial water, DMEA, dilution water 1 and dilution water 2 were 15.1, 34.0, 18.9, 7.6, 21.9, 9.3, 60 and 35 grams per minute, respectively, and the extruder speed was 350 rotations per minute. The aqueous dispersion had a solid content of 43.0 wt. % and a mean particle size of 0.6 micron. To prepare a coating composition of the same solid content, Primid QM-1260 equivalence and target solvent to dispersion solid ratio as the coating composition in Example 1, 118.7 gram of the aqueous dispersion, 57.7 grams of the basic water, 3.1 grams of Primid QM-1260 solution and 20.4 grams of solvent mixture were mixed in the same manner as in Example 1.

Example 8

The aqueous dispersion of Example 8 was prepared in the same manner as that in Example 1 with the exception that P613 was used instead of M899P and Polywax 655 was added to the blend. The feed rates of P613, V4200, P5980i, L641, PW655, initial water, DMEA, dilution water 1 and dilution water 2 were 136.1, 72.6, 57.5, 30.2, 6.1, 84.7, 29.7, 100 and 200 grams per minute, respectively, and the extruder speed was 1200 rotations per minute. The aqueous dispersion had a solid content of 42.1 wt. % and a mean particle size of 0.7 micron. To prepare a coating composition of the same solid content, Primid QM-1260 equivalence and target solvent to dispersion solid ratio as the coating composition in Example 1, 121.5 grams of the aqueous dispersion, 55.6 grams of the basic water, 2.5 grams of Primid QM-1260 solution and 20.5 grams of solvent mixture were mixed in the same manner as in Example 1.

Comparative Example A

The aqueous dispersion of Comparative Example A was prepared in the same manner as that in Example 1 with the exception that PP35R80 was used instead of M899P and the feed rates of initial water and DMEA were 63.5 and 28 grams per minute, respectively. The aqueous dispersion had a solid content of 44.6 wt. % and a volume mean particle size of 0.8 micron. To prepare a coating composition of the same solid content, Primid QM-1260 equivalence and target solvent to dispersion solid ratio as the coating composition in Example 1, 115.2 grams of the aqueous dispersion, 61.8 grams of the basic water, 2.54 grams of Primid QM-1260 solution and 20.5 gram of solvent mixture were mixed in the same manner as in Example 1.

Comparative Example B

The aqueous dispersion of Comparative Example B was prepared in the same manner as that in Example 1 with the exception that H739 was used instead of M899P and the feed rates of initial water and DMEA were 90.7 and 31.8 grams per minute, respectively. The dispersion had a solid content of 43.9 wt. % and a volume mean particle size of 1.9 micron. To prepare a coating composition of the same solid content, Primid QM-1260 equivalence and target solvent to dispersion solid ratio as the coating composition in Example 1, 116.8 grams of the aqueous dispersion, 60.3 grams of the basic water, 2.4 grams of Primid QM-1260 solution and 20.5 gram of solvent mixture were mixed in the same manner as in Example 1.

Comparative Example C

The aqueous dispersion of Comparative Example C was prepared in the same manner as that in Example 1 with the exception that P353 was used instead of M899P and the feed rates of initial water and DMEA were 84.7 and 28.0 grams per minute, respectively. The aqueous dispersion had a solid content of 46 wt. % and a volume mean particle size of 2.4 microns. To prepare a coating composition of the same solid content, Primid QM-1260 equivalence and target solvent to dispersion solid ratio as the coating composition in Example 1, 110.8 grams of the aqueous dispersion, 65.4 grams of the basic water, 3.4 grams of Primid QM-1260 solution and 20.4 gram of solvent mixture were mixed in the same manner as in Example 1.

Comparative Example D

The aqueous dispersion of Comparative Example D was prepared in the same manner as that in Example 1 with the exception that L7452 was used instead of M899P and the feed rates of L7452, V4200, P5980i, L641, initial water, DMEA, dilution water 1 and dilution water 2 were 34.8, 18.9, 14.4, 7.6, 31.8, 11, 120 and 0 grams per minute, respectively, and the extruder speed was 450 rotations per minute. The aqueous dispersion had a solid content of 37.5 wt. % and a volume mean particle size of 3.0 micron. To prepare a coating composition of the same solid content, Primid QM-1260 equivalence and target solvent to dispersion solid ratio as the coating composition in Example 1, 136.0 grams of the aqueous dispersion, 39.9 grams of the basic water, 3.7 grams of Primid QM-1260 solution and 20.4 grams of solvent mixture were mixed in the same manner as in Example 1.

Comparative Example E

The aqueous dispersion of Comparative Example E was prepared in the same manner as that in Example 1 with the exception that P613 was used instead of M899P, PP35R80 used instead of V4200 and the feed rates of P613, PP35R80, P5980i, L641, initial water, DMEA, dilution water 1 and dilution water 2 were 19.7, 34.0, 14.4, 7.6, 27.2, 7.2, 60 and 35 grams per minute, respectively, and the extruder speed was 750 rotations per minute. The aqueous dispersion had a solid content of 41.4 wt. % and a volume mean particle size of 2.0 micron. To prepare a coating composition of the same solid content, Primid QM-1260 equivalence and target solvent to dispersion solid ratio as the coating composition in Example 1, 123.8 grams of the aqueous dispersion, 53.2 grams of basic water, 2.5 grams of Primid QM-1260 solution and 20.5 grams of solvent mixture were mixed in the same manner as in Example 1.

Comparative Example F

The aqueous dispersion of Comparative Example F was prepared in the same manner as that in Example 1 with the exception that P613 was used instead of M899P, and the feed rates of P613, V4200, P5980i, L641, initial water, DMEA, dilution water 1 and dilution water 2 were 46.1, 7.6, 14.4, 7.6, 22.7, 7.6, 60 and 35 grams per minute, respectively, and the extruder speed was 450 rotations per minute. The aqueous dispersion had a solid content of 42.0 wt. % and a volume mean particle size of 1.8 micron. To prepare a coating composition of the same solid content, Primid QM-1260 equivalence and target solvent to dispersion solid ratio as the coating composition in Example 1, 122.0 grams of the aqueous dispersion, 55.0 grams of basic water, 2.6 grams of Primid QM-1260 solution and 20.5 grams of solvent mixture were mixed in the same manner as in Example 1.

Comparative Example G

The aqueous dispersion of Comparative Example G was prepared in the same manner as that in Example 1 with the exception that P613 was used instead of M899P, and the feed rates of P613, V4200, P5980i, L641, initial water, DMEA, dilution water 1 and dilution water 2 were 7.6, 46.1, 14.4, 7.6, 17.4, 7.1, 30 and 60 grams per minute, respectively, and the extruder speed was 450 rotations per minute. The aqueous dispersion had a solid content of 41.4 wt. % and a mean particle size of 0.6 micron. To prepare a coating composition of the same solid content, Primid QM-1260 equivalence and target solvent to dispersion solid ratio as the coating composition in Example 1, 123.8 grams of the aqueous dispersion, 53.2 grams of basic water, 2.5 grams of Primid QM-1260 solution and 20.5 grams of solvent mixture were mixed in the same manner as in Example 1.

Comparative Example H

The aqueous dispersion of Comparative Example G was prepared in the same manner as that in Example 1 with the exception that P613 was used instead of M899P, and the feed rates of P613, V4200, P5980i, L641, initial water, DMEA, dilution water 1 and dilution water 2 were 7.6, 41.6, 18.9, 7.6, 19.7, 9.0, 30 and 60 grams per minute, respectively, and the extruder speed was 450 rotations per minute. The aqueous dispersion had a solid content of 40.3 wt. % and a mean particle size of 0.5 micron. To prepare a coating composition of the same solid content, Primid QM-1260 equivalence and target solvent to dispersion solid ratio as the coating composition in Example 1, 126.7 grams of the aqueous dispersion, 49.7 grams of the basic water, 3.1 grams of Primid QM-1260 solution and 20.4 grams of solvent mixture were mixed in the same manner as in Example 1.

Coated Panel Preparation

Age the coating compositions at room temperature (23° C.) at least overnight before preparing coatings. Prepare each coated panel with a wire wound drawdown bar (#16) on a tinplate substrate (0.25 # Bright T-1 measuring 0.009×4"× 12") supplied by Lakeside Metal. Unless noted otherwise, cure the coated panel in a Despatch oven (serial #183952) at 205° C. for 4 minutes. The dry coating thickness is typically within the range of 7-10 μm (0.3-0.4 mil).

Retort Test

Use a Tuttnauer EZ10 or similar autoclave for the retort test. Prepare coated panels as discussed above. Cut the coated panels into 2 inch×3 inch strips. Place the strips of the coated panel into a glass container half filled with a food simulant (Campbell's® Chicken with Rice soup). Cover the containers with lids and place in autoclave set at 132° C. for 30 minutes. Allow the autoclave to cool to 60° C. before opening. Remove the test panels from the beaker, rinse with DI water and dry. Within 30 minutes of removing the test panels from the autoclave perform a cross-cut adhesion test and a pencil hardness test on the part of coated panels immersed in the food simulant.

Crosshatch Adhesion Test

Preform the crosshatch adhesion according to ASTM D 3359-09, method "B" as the coating thickness is less than 5 mils in thickness. Briefly, for this test make a square lattice pattern with 10 cuts in each direction with 1 mm distance between two neighboring cuts. Apply a pressure-sensitive tape over the lattice and then remove. Evaluate the adhesion according to the following scale:

5B—The edges of the cuts are completely smooth; none of the squares of the lattice detach.
    4B—Small flakes of the coating are detach at intersections; less than 5% of the area affected.
    3B—Small flakes of the coating detach along edges and at intersections of cuts. The area affected is 5 to 15% of the lattice.
    2B—The coating has flaked along the edges and on parts of the squares. The area affected is 15 to 35% of the lattice.
    1B—The coating has flaked along the edges of cuts in large ribbons, and whole squares have detached. The area affected is 35 to 65% of the lattice.
    0B—Flaking and detachment worse than Grade 1.

The test results are shown in Table 2, below.

Pencil Hardness

Conduct the pencil hardness test according to ASTM method D3363-06. The gouge hardness, the hardest pencil that will leave the film uncut, was reported. Use a Derwent Graphic pencil set (20 piece pack, 9B to 9H, with 9B the softest grade) for testing. The test results are shown in Table 2, below.

TABLE 2

Performance Comparison of Coating Compositions

| Example # | Melt Blend Product (wt. %, Acid Functionalized Polypropylene Base polymer/Propylene Copolymer/Functionalized Polypropylene Wax/Acid Functionalized Polyolefin) | Retort in Campbell's Chicken with Rice Soup (132° C., 30 min) Adhesion | Pencil hardness |
|---|---|---|---|
| Example 1 | 46/25/19/10 M899P/V4200/P5980i/L641 | 4B | B |
| Example 2 | 46/25/19/10 M199P/V4200/P5980i/L641 | 5B | HB |
| Example 3 | 46/25/19/10 M100P/V4200/P5980i/L641 | 3B | B |
| Example 4 | 46/25/19/10 P613/V4200/P5980i/L641 | 5B | B |
| Example 5 | 54/17/19/10 P613/V4200/P5980i/L641 | 5B | 4B |
| Example 6 | 26/45/19/10 P613/V4200/P5980i/L641 | 5B | HB |
| Example 7 | 20/45/25/10 P613/V4200/P5980i/L641 | 5B | 3B |
| Example 8 | 45/24/19/10/2 P613/V4200/P5980i/L641/Polywax 655 | 5B | 4B |
| Comparative Example A | 46/25/19/10 PP35R80/V4200/P5980i/L641 | 3B | 6B |
| Comparative Example B | 46/25/19/10 H739/V4200/P5980i/L641 | 0B | 9B |
| Comparative Example C | 46/25/19/10 P353/V4200/P5980i/L641 | 3B | 6B |
| Comparative Example D | 46/25/19/10 L7452/V4200/P5980i/L641 | 3B | 9B |
| Comparative Example E | 26/45/19/10 P613/PP35R80/P5980i/L641 | 0B | 2B |
| Comparative Example F | 61/10/19/10 P613/V4200/P5980i/L641 | 1B | 4B |
| Comparative Example G | 10/61/19/10 P613/V4200/P5980i/L641 | 2B | 9B |
| Comparative Example H | 10/55/25/10 P613/V4200/P5980i/L641 | 2B | 9B |

The data in Table 2 show that dispersions prepared with high melting point and acid functionalized resins (Example 1-8) give excellent coating performance as manifested by minimal coating adhesion loss or coating softening after retort tests. In comparison, dispersions prepared with resins having lower melting point without acid functionality (Comparative Example A), resins having high melting point but no acid functionality (Comparative Example B), or resins having lower melting point with acid functionality (Comparative Example C&D) all give inferior coating performances as manifested in either significant adhesion loss or significant coating softening or both after the retort test. Comparative Example E further show that incorporating lower density or low melting point co-binder (V-4200) is important for good coating performances. Comparative Example F-H demonstrate that there is an optimum composition range of the dispersion polymer composition for superior coating performances.

What is claimed:
1. An aqueous dispersion, comprising:
   a solid content from 15 weight percent (wt %) to 60 wt % based on a total weight of the aqueous dispersion, the solid content comprises a melt blend product having:
   15 to 60 wt % of an acid functionalized polypropylene base polymer having a melting point of 155° C. to 170° C.;
   16 to 50 wt % of a polypropylene copolymer having a density of less than 0.88 grams/cubic centimeter (g/cm$^3$);
   5 to 20 wt % of an acid functionalized polypropylene wax; and
   15 to 30 wt % of an acid functionalized polyolefin, wherein the wt % is based on a total weight of the melt blend product and components of the melt blend product add to 100 wt %; and
   an aqueous composition.
2. The aqueous dispersion of claim 1, wherein the melt blend product includes 20 to 55 wt % of the acid functionalized polypropylene base polymer having the melting point of 155° C. to 170° C.
3. The aqueous dispersion of claim 1, wherein the melt blend product includes 26 to 46 wt % of the acid functionalized polypropylene base polymer having the melting point of 155° C. to 170° C.
4. The aqueous dispersion of claim 1, wherein the acid functionalized polypropylene base polymer having the melting point of 155° C. to 170° C. has an acid number of 2 to 15.
5. The aqueous dispersion of claim 1, wherein the acid functionalized polypropylene base polymer has a melting point of 160° C. to 170° C.
6. The aqueous dispersion of claim 1, wherein the acid functionalized polypropylene base polymer has a melting point of 162° C. to 167° C.
7. The aqueous dispersion of claim 1, wherein the melt blend product includes 17-45 wt % of the polypropylene copolymer having a density of less than 0.88 g/cm$^3$.
8. The aqueous dispersion of claim 1, wherein the melt blend product includes 5 to 15 wt % of the acid functionalized polypropylene wax.
9. The aqueous dispersion of claim 1, wherein the melt blend product includes 9 to 11 wt % of the acid functionalized polypropylene wax.
10. The aqueous dispersion of claim 1, wherein the melt blend product includes 15 to 25 wt % of the acid functionalized polyolefin.
11. The aqueous dispersion of claim 1, wherein the melt blend product includes 19 to 25 wt % of the acid functionalized polyolefin.
12. The aqueous dispersion of claim 1, wherein the acid functionalized polypropylene wax is maleic anhydride modified polypropylene wax.
13. The aqueous dispersion of claim 1, wherein the polypropylene copolymer having a density of less than 0.88 g/cm$^3$ is formed with propylene and ethylene, wherein the polypropylene copolymer has a melt index value, as determined by ASTM D-1238 at 230° C. and 2.16 kg, of about 25 g/10 min and a glass transition temperature of about −26° C.
14. The aqueous dispersion of claim 1, wherein the acid functionalized polyolefin is an ethylene-acrylic acid copolymer.
15. The aqueous dispersion of claim 1, wherein the acid functionalized polypropylene base polymer having a melting point of 155° C. to 170° C. is an anhydride modified polypropylene.

16. The aqueous dispersion of claim 1, further including 0.1 to 10 wt % of a polyethylene wax, wherein the wt % is based on the total weight of the melt blend product.

17. A coating composition, comprising:
- 15 to 100 wt % of the aqueous dispersion of claim 1 based on total weight of the coating composition;
- a solvent, wherein the solvent is from 0 wt % to 80 wt % based on the solid content of the aqueous dispersion used to make the coating composition;
- a crosslinker, wherein the crosslinker is from 0 wt % to 6 wt % based on the solid content of the aqueous dispersion used to make the coating composition;
- a basic water composition comprising from 90 to 99.99 wt % of water based on a total weight of the basic water composition and from 0.01 percent to 10 wt % of a base based on the total weight of the basic water composition, wherein the basic water composition is from 0 wt % to 85 wt % of the coating composition based on a total weight of the coating composition.

18. The coating composition of claim 17, wherein the crosslinker comprises a hydroxylalkyl hydroxyalkyl amide.

19. A coated article comprising a substrate and a coating on the substrate, wherein the coating includes the coating composition of claim 17.

20. A coated article comprising a substrate and a cured coating on the substrate, wherein the cured coating is formed by curing the coating composition of claim 17.

* * * * *